(12) United States Patent
Chen et al.

(10) Patent No.: US 7,891,703 B2
(45) Date of Patent: Feb. 22, 2011

(54) RETAINER AND INFLATOR

(75) Inventors: Jianlin Chen, Aichi (JP); Atsuhiro Arai, Chita-Gun (JP); Yoji Tasaki, Chita-Gun (JP)

(73) Assignee: Autoliv ASP, Inc., Ogden, UT (US)

( * ) Notice: Subject to any disclaimer, the term of this patent is extended or adjusted under 35 U.S.C. 154(b) by 93 days.

(21) Appl. No.: 12/305,412

(22) PCT Filed: Jun. 7, 2007

(86) PCT No.: PCT/JP2007/061543

§ 371 (c)(1),
(2), (4) Date: Dec. 18, 2008

(87) PCT Pub. No.: WO2007/148542

PCT Pub. Date: Dec. 27, 2007

(65) Prior Publication Data
US 2009/0200780 A1 Aug. 13, 2009

(30) Foreign Application Priority Data
Jun. 20, 2006 (JP) .............................. 2006-170412

(51) Int. Cl.
B60R 21/26 (2006.01)
(52) U.S. Cl. ...................................... 280/736
(58) Field of Classification Search ................ 280/736, 280/741; 102/530, 531
See application file for complete search history.

(56) References Cited

U.S. PATENT DOCUMENTS

| 6,527,297 B1 | 3/2003 | Parkinson et al. | |
| 6,540,256 B2 * | 4/2003 | Iwai et al. | 280/736 |
| 6,739,621 B2 * | 5/2004 | Parkinson et al. | 280/741 |
| 6,854,395 B2 * | 2/2005 | Katsuda et al. | 102/530 |
| 2002/0053788 A1 | 5/2002 | Iwai et al. | |
| 2002/0070540 A1 * | 6/2002 | Yamazaki et al. | 280/741 |
| 2002/0079681 A1 * | 6/2002 | Yamazaki et al. | 280/741 |
| 2003/0010247 A1 * | 1/2003 | Miyaji et al. | 102/530 |
| 2005/0184497 A1 | 8/2005 | Miyaji et al. | |

FOREIGN PATENT DOCUMENTS

| JP | 11-334517 | 12/1999 |
| JP | 2001-233167 A | 8/2001 |
| JP | 2004-507435 A | 3/2004 |
| WO | WO-01/62558 A1 | 8/2001 |
| WO | WO-02/18302 A1 | 3/2002 |

* cited by examiner

*Primary Examiner*—Paul N Dickson
*Assistant Examiner*—Robert A Coker
(74) *Attorney, Agent, or Firm*—Harness, Dickey & Pierce, P.L.C.

(57) ABSTRACT

An inflator includes a plate-like retainer that is placed in a pressure container of the inflator for producing gas to be supplied to an airbag. At the center of inflator is formed a fitting section fitted to a tube placed in the pressure container. The tube separates an ignition source and a gas generation agent. At least one pressure release hole is provided on the outer side of the outer periphery of the fitting section. The retainer has a step formed at a portion where the outer periphery of the retainer is in contact with the filter. The retainer and inflator may have simple structures not affecting productivity and reliably preventing gas leakage between the retainer and a filter.

13 Claims, 7 Drawing Sheets

RETAINER AND INFLATOR

CROSS-REFERENCE TO RELATED APPLICATIONS

This application is a 371 U.S. National Stage of International Application No. PCT/JP2007/061543, filed Jun. 7, 2007. This application claims the benefit of Japanese Patent Application No. JP 2006-170412, filed Jun. 20, 2006, which application is herein expressly incorporated by reference.

TECHNICAL FIELD

The present invention relates to a retainer which is one of the constituent parts of an inflator, and to the inflator equipped with this retainer. Inflator generates gas and the gas is supplied to the airbag which is installed in automobiles as a safety device.

BACKGROUND ART

Airbag device comprises an inflator which is a gas-generating device, and an airbag. The airbag deploys due to the gas generated by the inflator, protecting passengers from impact during a collision.

Figure 7:
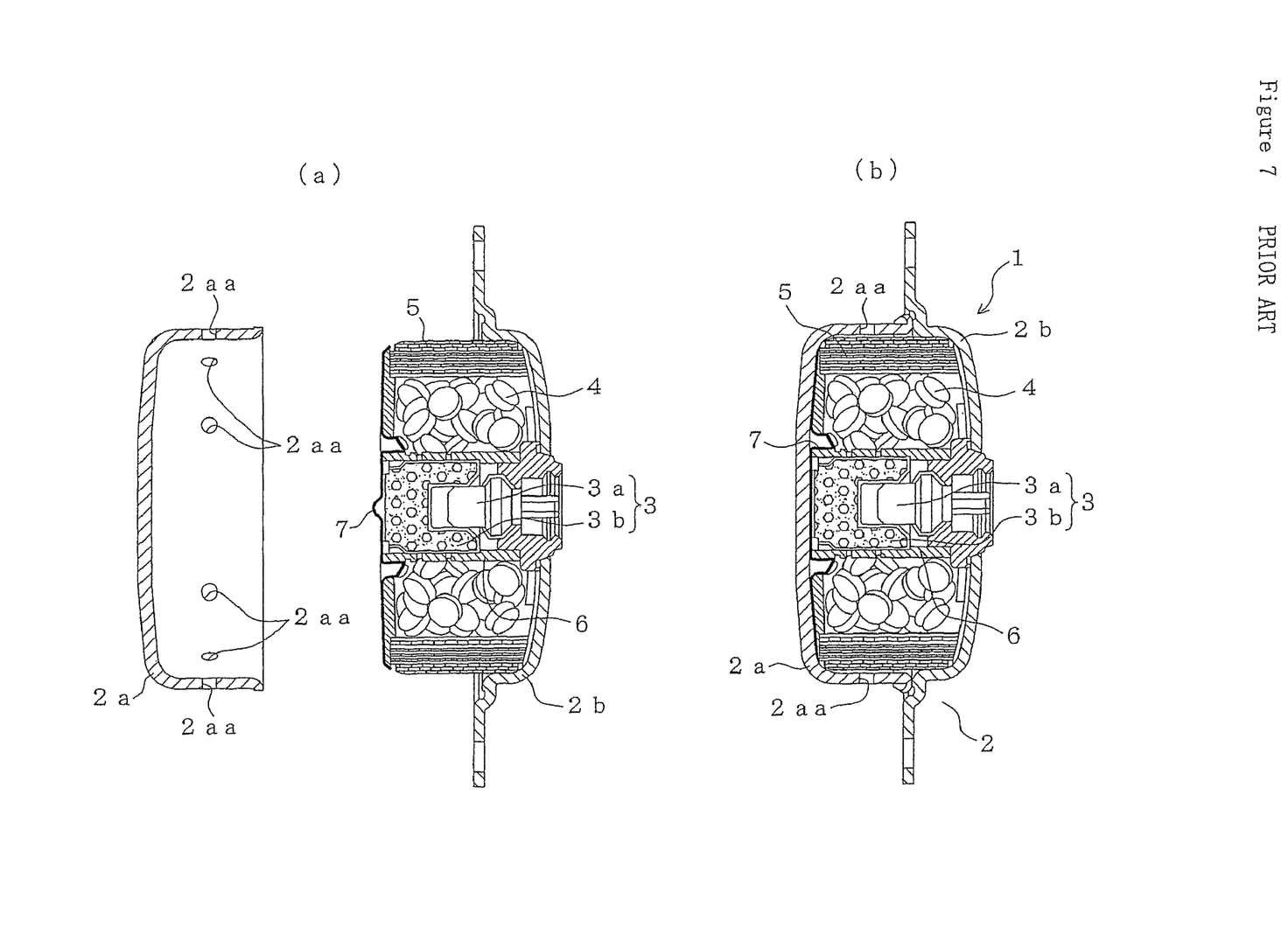
FIG. 7 is a sectional view illustrating the construction of an inflator, and (a) is prior to welding of the pressure container, and (b) is after welding of the pressure container.

As shown in FIG. 7, an inflator 1 typically includes a pressure container 2 having a diffuser 2a and a shallow dish base 2b in the pressure container 2, and an ignition means 3 operating due to an electrical signal generated after a collision is detected and gas generant 4 ignited by the ignition means 3 are housed. The ignition means 3 is composed of an initiator 3a and ignition enhancer 3b.

At the time of collision, the gas generant 4 burns, and instantaneously harmless gas is generated. The generated gas passes through a filter 5 and is finally discharged from gas exits 2aa. In order to burn the gas generant 4 safely and stably, a diffuser 2a, shown separately in FIG. 7 (a) in a state prior to welding, is welded to the base 2b, as shown in FIG. 7 (b), so that the gas generant 4 is enclosed.

Patent Reference 1: Japanese Laid-Open Patent Application No. H11-334517

DISCLOSURE OF THE INVENTION

Problem to be Solved

Figure 8:
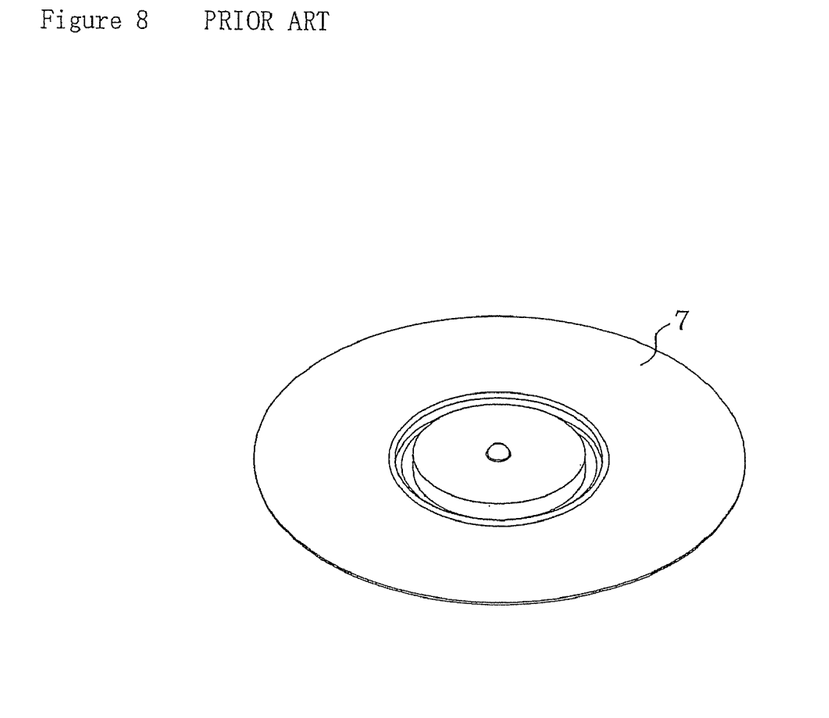
FIG. 8 is an upper perspective view of a plate-shaped retainer.

In order to prevent the filter 5 from dropping and the gas generant 4 from spilling out of the filter 5 when in welding the inflator, a disk-shaped retainer 7 as shown in FIG. 8 is fixed onto a tube 6 which separates the ignition means 3 from the gas generant 4, thereby retaining the filter 5 and the gas generant 4. This retainer 7 also serves the function of preventing gas leakage from between the inner surface of the diffuser 2a and the filter 5 when the inflator 1 operates.

Figure 9:
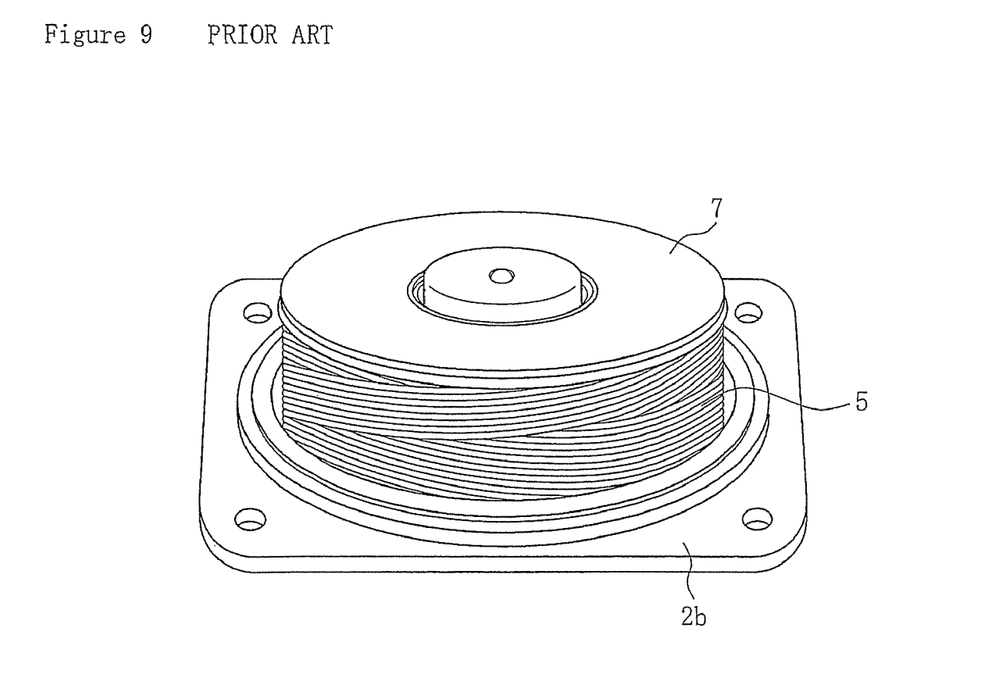
FIG. 9 is an upper perspective view of the state before operation of an inflator, prior to attaching a diffuser to a base by welding.
Figure 10:
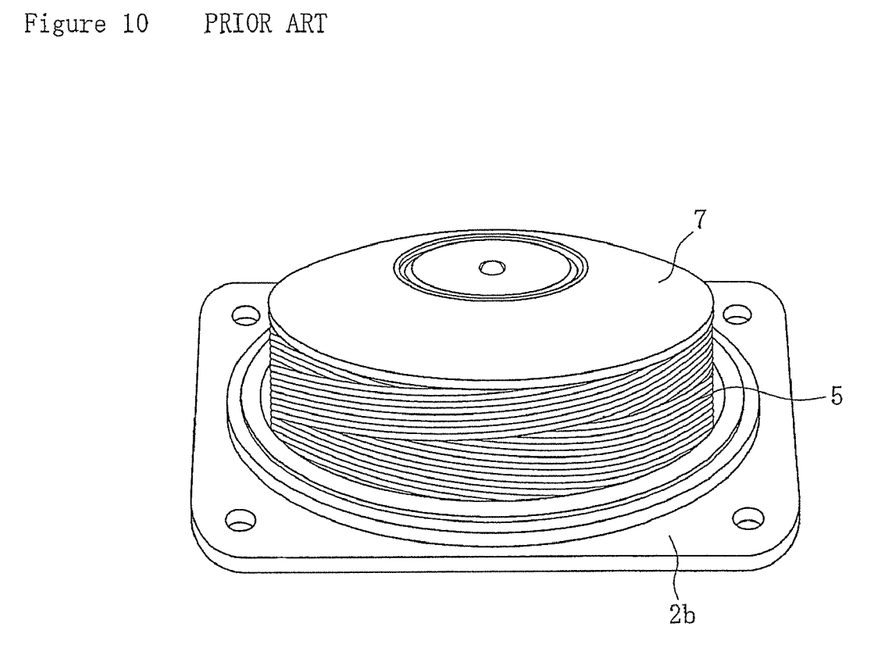
FIG. 10 is an upper perspective view of the state when a diffuser is detached after operation of a conventional inflator.

The pressure container of inflator expands greatly, as a result of the combustion pressure of the gas generant when the inflator operates. As this happens, the retainer also expands greatly in an outward direction shown in FIG. 10, from the state prior to the inflator operation shown in FIG. 9.

Figure 11:
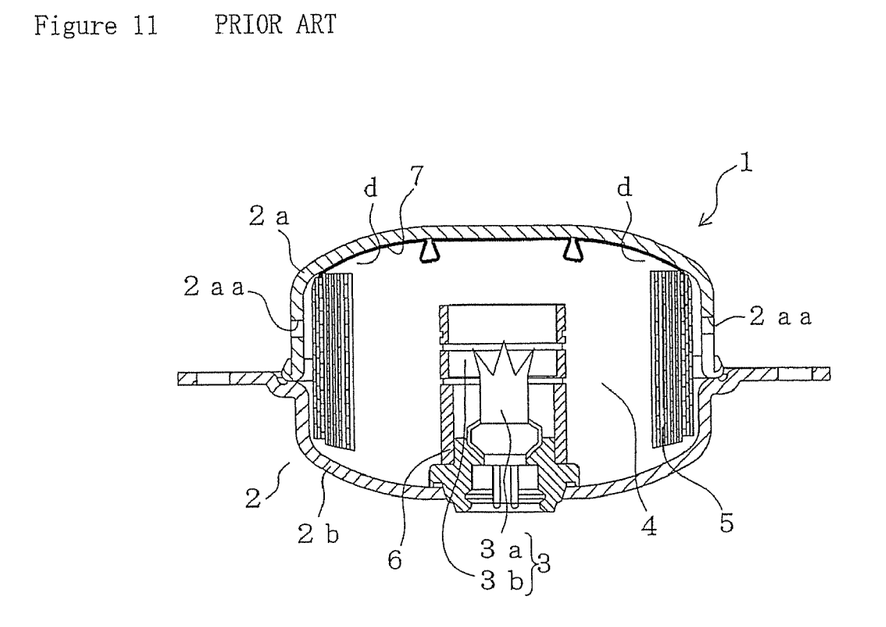
FIG. 11 is a drawing illustrating large gaps between a filter and a retainer, formed during operation of a conventional inflator.

At this time, large gaps d as shown in FIG. 11 are formed between the retainer 7 and the filter 5 which were originally in close contact with each other. When such large gaps are formed, gas starts to leak from these gaps, and solid residue is discharged in large quantities to outside of the inflator.

Figure 12:
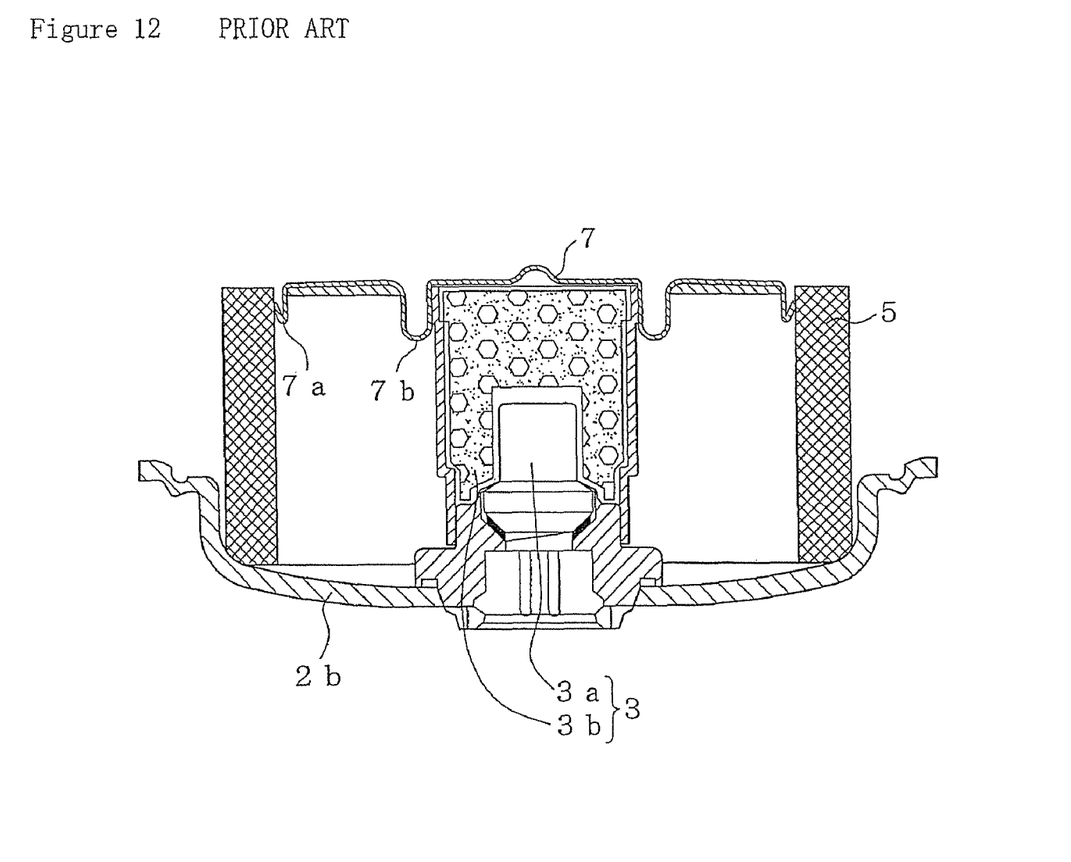
FIG. 12 is a sectional view illustrating the state of attachment of the retainer with a crimped edge.

As shown in FIG. 12, the retainer 7 having a crimped edge 7a on the outer periphery is believed to be effective in sealing the large gaps formed between the filter and the retainer when the inflator operates. By attaching the crimped edge 7a so that it is introduced inside the filter 5, the retainer 7 with the crimped edge can maintain a sealed state of the gap between the retainer 7 and the filter 5, even if the pressure container 2 expands and changes its shape.

However, there are two problems with this crimped edge retainer. First, the crimped edge must be fabricated in a shape so that the crimped edge will enter the filter in the state of its arrangement. Accordingly, the shape of the retainer becomes complicated. Furthermore, high accuracy of manufacturing is required for positioning an engaging member to engage with the tube, with the result that production is no longer easy, and the manufacturing costs greatly increase.

Second, it is required to press fit the crimped edge of the retainer into the filter in order to fix the filter. Since a dimple 7b in the center and the crimped edge 7a on the outer periphery must be pressed inward simultaneously, it becomes extremely difficult to match their positions. It is expected that the amount of scrap will increase during manufacture, since the production yield becomes poor.

The problem which the present invention aims to solve is that in the case of a conventional retainer, high accuracy of manufacturing is required, production is no longer easy, and it becomes extremely difficult to match the positions in order to seal the large gap between the filter and the retainer which are formed when the inflator operates.

Means for Solving the Problem

An object of the present invention is to provide a retainer which reliably prevents leakage of gas from between the retainer and a filter, and has a simple construction without negative effects on productivity. The retainer has a plate-shaped design and is inserted into the pressure container of inflator which generates gas being supplied to airbag. The retainer comprises an engaging section formed at the center which engages with a tube provided to separate an ignition means from a gas generant. The retainer also comprises at least one pressure release hole provided on the outer periphery side of the engaging section.

In the case where a step portion is provided at an area of contact with the filter on the outer periphery side, the gas passageway becomes long, making it difficult for gas to pass between the retainer and the filter.

In the present invention, the positions of the pressure release holes can be determined in any desired manner, but it is preferable when they are provided in a position according to point symmetry with respect to the center of the retainer or in a position according to line symmetry with respect to the center line of the retainer, so that the pressure between the retainer and the pressure container is distributed uniformly. When the pressure release holes are provided on a plurality of circumferences, the pressure can be favorably distributed between the retainer and the pressure container. When the pressure release holes are provided on a constant radius, it preferably reduces the excessive release of pressure from the retainer.

In an inflator equipped with the retainer of the present invention, the pressure balance on the front and back sides of the retainer is maintained during operation, and there is little deformation of the retainer caused by combustion pressure. Therefore, close contact is maintained between the step portion on the outer periphery side of the retainer and the inner side of the filter. Accordingly, it is possible to effectively prevent leakage of gas from the end of the filter, and there is little solid residue in the gas discharged from the gas discharge holes of the pressure container to outside of the inflator.

Advantageous Effects of the Invention

In the present invention, an engaging section is formed to engage with the tube at the center, and at least one pressure release hole is provided on the outer periphery side from this engaging section. As a consequence of such a simple construction, manufacturing is easy.

When the inflator operates, a portion of the gas generated within the inflator flows from the pressure release holes into the space between the retainer and the diffuser. A pressure balance is thereby maintained at the front and back sides of the retainer in the process of pressure rise due to the combustion of the gas generant. Therefore, the present invention makes it possible to reduce deformation of the retainer due to combustion pressure, and makes it possible to maintain a state of close contact between the retainer and the filter, and makes it possible to reduce solid residue in gas discharged from the gas discharge holes of the pressure container to outside of the inflator.

DESCRIPTION OF THE REFERENCE SYMBOLS

2 Pressure container
2aa Gas discharge hole
3 Ignition means
4 Gas generant
5 Filter
6 Tube
11 Retainer
11a Engaging section
11b Pressure release hole
11c Step portion
12 Inflator

PREFERRED EMBODIMENT

It is conceivable that a retainer provided with a crimped edge on the outer periphery would be effective in sealing the large gaps between the filter and the retainer when the inflator operates. However, this retainer is complex in shape, and requires high accuracy to produce it, and is thus not easy to manufacture. Moreover, it becomes extremely difficult to position precisely the filter and the retainer.

The present invention has a simple construction, and is easy to manufacture. The present invention also achieves the object of preventing gas from leaking between the retainer and the filter as much as possible, by providing at least one pressure release hole on the outer periphery side of the engaging section formed which engages with the tube formed in the center.

Embodiments

In the following, FIG. 1 to FIG. 4 are used to describe the preferred embodiment of the present invention.

Figure 1:
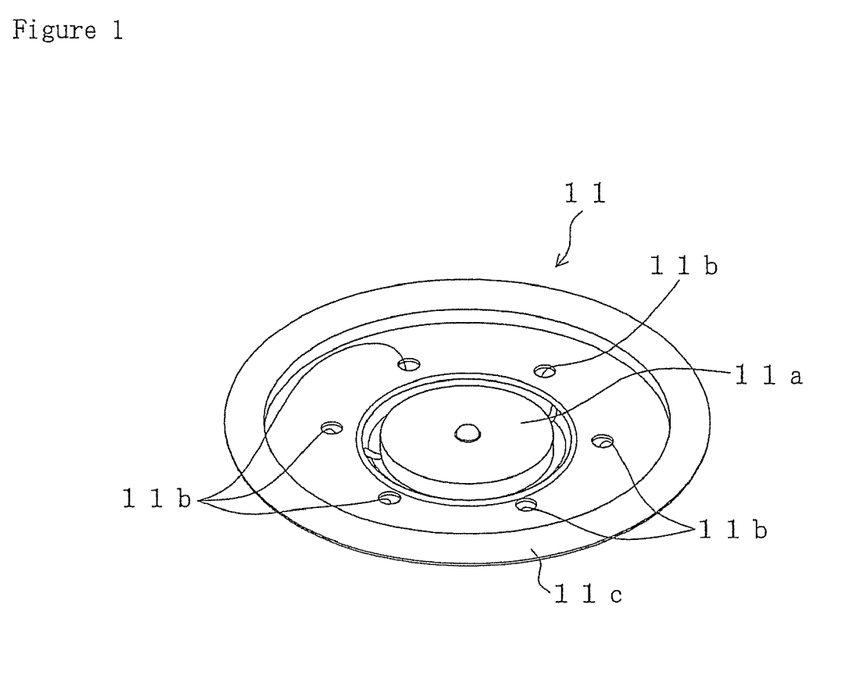
FIG. 1 is an upper perspective view of a retainer of the present invention.
Figure 2:
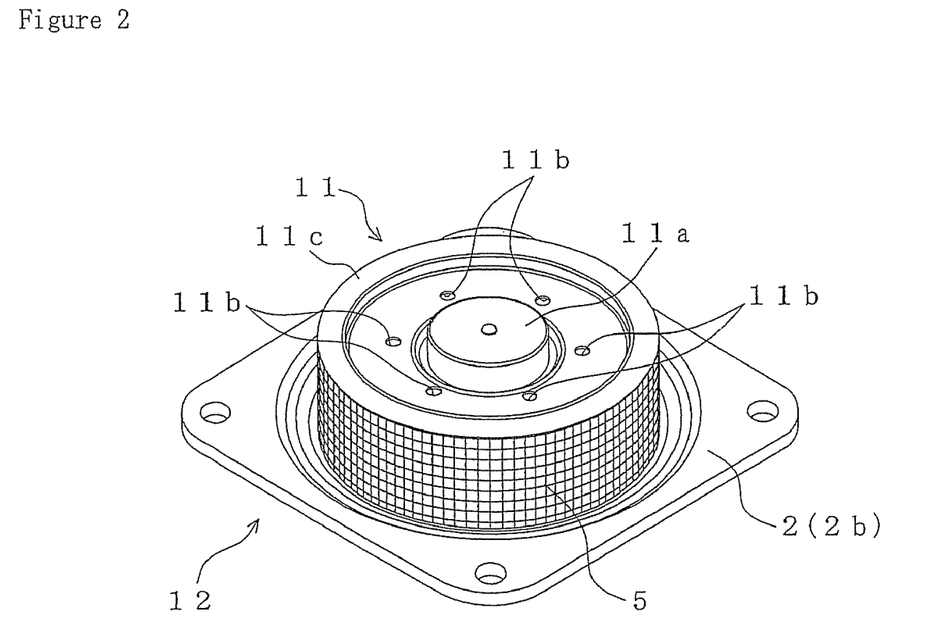
FIG. 2 is an tipper perspective view of the state that the retainer is attached before welding.
Figure 3:
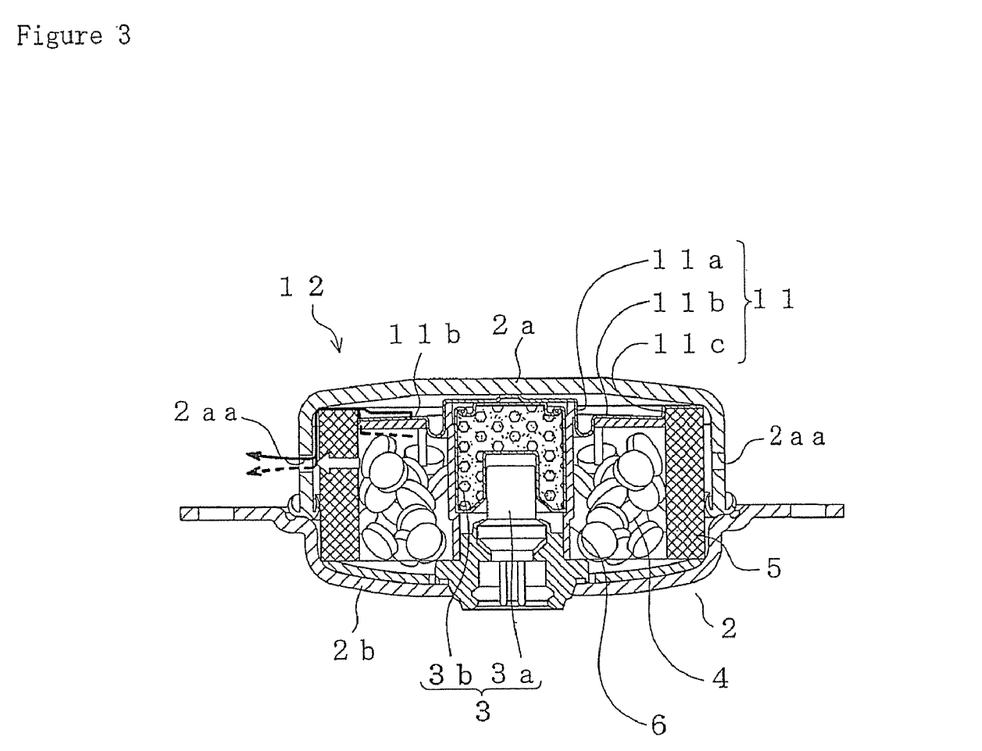
FIG. 3 is a drawing describing the mechanism whereby the amount of residue is reduced in a present invention inflator with the present invention retainer attached.
Figure 4:
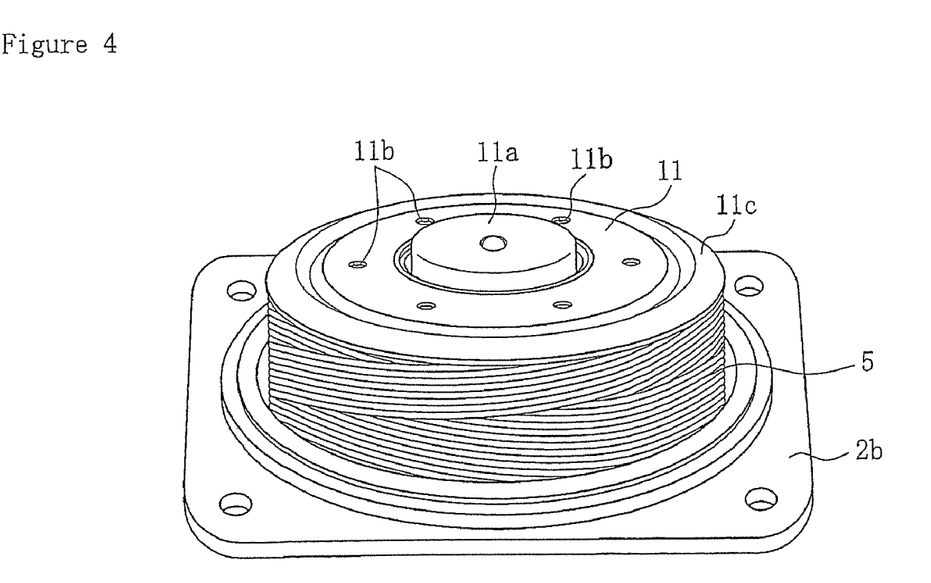
FIG. 4 is an upper perspective view of the state when the diffuser is detached after operation of the present invention inflator.

FIG. 1 is an upper perspective view of a retainer of the present invention. FIG. 2 is an upper perspective view of the state that the retainer is attached before welding. FIG. 3 is a drawing describing the mechanism whereby the amount of residue is reduced in a present invention inflator with the present invention retainer attached. FIG. 4 is an upper perspective view of the state when the diffuser is detached after operation of the present invention inflator.

The present invention retainer 11 has an engaging section 11a formed centrally for the purpose of engaging with the front end of the tube 6 disposed within the pressure container 2. In addition, six (6) pressure release holes 11b are provided in a constant radius above the insertion position of the gas generant 4 on the outer periphery side of the engaging section 11a, for example.

It is desirable for these pressure release holes 11b to be provided at circumferentially equidistant positions, so that the gas pressure balance is suitably maintained on the front and back sides of the retainer. The radial position and the number thereof are determined for the purpose.

In the case of the present invention retainer 11 shown in FIG. 1 to FIG. 4, there is also a step portion 11c formed at the area of contact with the filter 5 on the outer periphery side. This step portion 11c is formed so as to lengthen the gas passageway between the retainer 11 and the filter 5, making it difficult for the gas to pass through. Thus, there is no need to match with the filter 5 with high accuracy like a crimped edge 7a of the retainer 7 with the crimped edge shown in FIG. 12.

Such a present invention retainer 11 has a simple construction, with the engaging section 11a and the pressure release hole 11b and, as needed, a simple step portion 11c. Since high accuracy of manufacturing is needed only for the engaging section 11a, so manufacturing becomes easy and it can be produced at lower cost.

In the case of the present invention inflator 12, in which the retainer 11 is attached, when the inflator 12 operates, the flow of gas from inside of the inflator 12 is conceived of according to the following three (3) routes. These three routes are explained below using FIG. 3.

In the first route, the gas escapes to the top of the retainer 11 from the pressure release hole 11b provided to the retainer 11. The gas passes through the gaps between the inner periphery of the diffuser 2a and the retainer 11, and reaches the gas discharge hole 2aa (shown by the arrow with a thick solid line in FIG. 3).

This first route is longer than the other two routes, so the volume of flowing gas is thought to be low. Furthermore, due to the fact that there is little solid residue passing through the pressure release hole 11b, and due to the fact that it passes through the gaps between the inner periphery of the diffuser 2a and the retainer 11, even if the solid residue were to pass through the pressure release hole 11b, there is thought to be little possibility that the solid residue would be discharged.

In the second route, the gas passes between the retainer 11 and the filter 5, and reaches the gas discharge hole 2aa of the pressure container (shown by the arrow with a thick broken line in FIG. 3). When the volume of gas passing through this second route becomes large, the amount of solid residue discharged to outside of the inflator 12 becomes large.

In the third route, the gas passes through the filter 5, and reaches the gas discharge hole 2aa of the pressure container (shown by the white arrow with a black outline in FIG. 3). This third route is considered to be the easiest one for the gas to get through, in comparison with the first and second routes, and is the most desirable route.

Since a small volume of gas flows through the first route when the present invention inflator 12 operates, a pressure balance is maintained above and below the retainer 11, and there is little deformation of the retainer 11 by combustion pressure (see FIG. 4). There is very little solid residue in the gas discharged to the outside of the inflator 12 from the gas discharge hole 2aa of the pressure container 2 via this first route.

Since close contact is maintained between the retainer 11 and the filter 5, the volume of gas flowing through the second route can be kept low. Consequently, the amount of solid residue in the gas discharged to outside of the inflator 12 is small.

Comparative experiments were performed, using the inflator 12 of the present invention shown in FIG. 1 with the retainer 11 of the present invention shown in FIGS. 2 and 3, and the conventional inflator 1 shown in FIG. 7(b) with the conventional retainer 7 shown in FIG. 7. The results are shown in TABLE 1 below.

TABLE 1

|  |  | Test Temperature (° C.) | Residue within the Pressure Container (g) | Free Particles in Air (g) | Total Amount of Residue (g) |
| --- | --- | --- | --- | --- | --- |
| conventional | 1 | 85 | 1.60 | 0.26 | 1.86 |
|  | 2 | 85 | 2.56 | 0.37 | 2.93 |
| Present invention | 3 | 85 | 0.50 | 0.17 | 0.67 |
|  | 4 | 85 | 0.60 | 0.20 | 0.80 |
|  | 5 | 85 | 0.47 | 0.13 | 0.60 |

TABLE 1 clearly shows that using an inflator attaching the present invention retainer makes it possible to reduce greatly the amount of residue discharged from the inflator to the outside. This means that above explanations are correct with regard to the gas flow routes from inside the inflator when the inflator operates.

The present invention is not limited to the above example, and may of course be suitably modified, as long as it is within the scope of the technical concepts recited in the claims.

Figure 5:
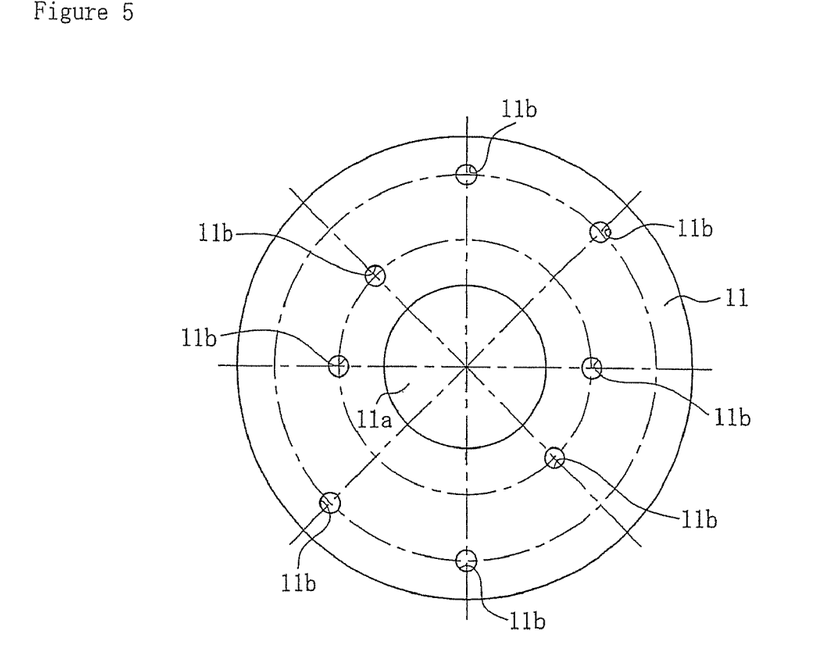
FIG. 5 is a plane view showing a retainer according to an embodiment of the present invention.
Figure 6:
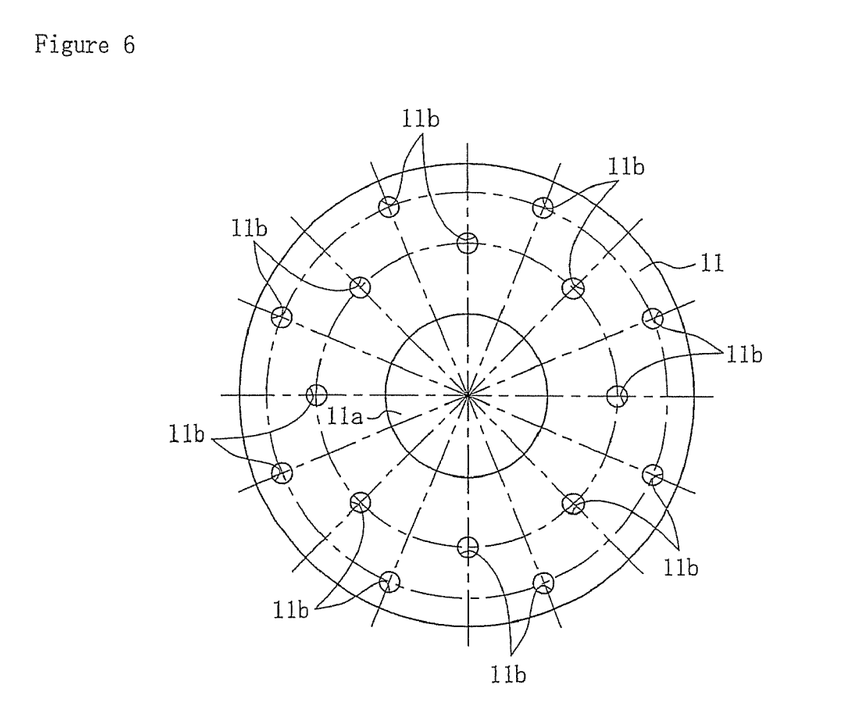
FIG. 6 is a plane view showing a retainer according to another embodiment of the present invention.

For example, in the example illustrated by FIG. 1-4, the retainer 11 is shown to be formed with the step portion 11c at an area of contact with the filter on the outer periphery side, but it is also acceptable not to provide a step portion, as shown in the examples of FIG. 5 and FIG. 6.

These FIGS. 5 and 6 show examples of other variations in disposition of pressure release holes 11b provided to the retainer 11. These pressure release holes 11b are provided on two circumferences. In FIG. 5, they are disposed according to point symmetry with respect to the center of the retainer 11. In FIG. 6, they are disposed according to line symmetry with respect to the center line of the retainer 11. These variations serve to maintain a suitable pressure balance on both the front and the back surfaces of the retainer, and a disposition having geometrical symmetry is preferable for suitably imparting a pressure balance.

The invention claimed is:

1. A plate-shaped retainer in combination with an inflator having a diffuser, the retainer inserted into a pressure container of the inflator which generates a gas supplied to an airbag, the retainer comprising:
    an engaging section formed at a center for engaging a tube provided in the pressure container to separate an ignitor device from a gas generant;
    at least one pressure release hole provided on an outer periphery side of the engaging section, the at least one pressure release hole extending through the retainer; and
    a gas flow path extending through the at least one pressure release hole and through a gap between the retainer and the diffuser;
    wherein a first portion of the gas from inside the inflator flows through the gas flow path.

2. The retainer according to claim 1, further comprising a step portion formed at an area of contact with a filter on the outer periphery side.

3. The retainer according to claim 2, wherein the at least one pressure release hole is provided on an inner periphery side of the step portion.

4. The retainer according to claim 1, wherein the at least one pressure release hole is disposed according to point symmetry with respect to a center of the retainer.

5. The retainer according to claim 1, wherein the at least one pressure release hole is disposed in a position according to line symmetry with respect to a line passing through a center of the retainer.

6. The retainer according to claim 1, wherein the at least one pressure release hole is provided on a constant radius.

7. An airbag inflator comprising:
    a pressure container having a diffuser;
    a plate-shaped retainer inserted into the pressure container, the retainer including an engaging section formed at a center for engaging a tube in the pressure container to separate an ignitor from a gas generant, the retainer further including at least one pressure release hole provided on an outer peripheral side of the engaging section; and
    a gas flow path extending through the at least one pressure release hole and through a gap between the retainer and the diffuser through which a portion of the gas from the inflator flows.

8. The airbag inflator of claim 7, wherein the retainer includes a step portion formed at an area of contact with a filter on the outer periphery side.

9. The airbag inflator of claim 8, wherein the at least one pressure release hole is provided on an inner periphery side of the step portion.

10. The airbag inflator of claim 7, wherein the at least one pressure release hole is disposed according to point symmetry with respect to a center of the retainer.

11. The airbag inflator of claim 7, wherein the at least one pressure release hole is disposed in a position according to line symmetry with respect to a line passing through a center of the retainer.

12. The airbag inflator of claim 7, wherein the at least one pressure release hole is provided on a constant radius.

13. The airbag inflator of claim 7, wherein a second portion of the gas radially passes through a filter.

* * * * *